United States Patent
Das et al.

(10) Patent No.: US 9,734,001 B2
(45) Date of Patent: Aug. 15, 2017

(54) EFFICIENT HEALTH MANAGEMENT, DIAGNOSIS AND PROGNOSIS OF A MACHINE

(71) Applicant: Lockheed Martin Corporation, Bethesda, MD (US)

(72) Inventors: Sreerupa Das, Oviedo, FL (US); Amar Patel, Orlando, FL (US); Steven McNamara, Davenport, FL (US); Jonathan Todd, Cocoa, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1029 days.

(21) Appl. No.: 13/860,051

(22) Filed: Apr. 10, 2013

(65) Prior Publication Data

US 2013/0268241 A1 Oct. 10, 2013

Related U.S. Application Data

(60) Provisional application No. 61/622,141, filed on Apr. 10, 2012.

(51) Int. Cl.
   *G06F 11/00* (2006.01)
   *G01M 99/00* (2011.01)
   *G05B 23/02* (2006.01)

(52) U.S. Cl.
   CPC .......... *G06F 11/00* (2013.01); *G01M 99/005* (2013.01); *G05B 23/024* (2013.01); *G05B 23/0254* (2013.01)

(58) Field of Classification Search
   CPC ....................................................... G06F 11/00

(Continued)

(56) References Cited

U.S. PATENT DOCUMENTS 6,859,831 B1 2/2005 Gelvin et al.
7,581,434 B1 9/2009 Discenzo et al.
(Continued)

FOREIGN PATENT DOCUMENTS

EP    1935576 A1    6/2008
GB    2514980 A     12/2014
WO    2013155161 A1 10/2013

OTHER PUBLICATIONS

Bergemann, Tobias, "Bytecode," Wikipedia, the free encyclopedia, retrieved from https://en.wikipedia.org/w/index.php?title=Bytecode&oldid=598575789, last edited Mar. 7, 2014, Wikipedia Foundation, 3 pages.
(Continued)

*Primary Examiner* — Ricky Ngon
(74) *Attorney, Agent, or Firm* — Withrow & Terranova, PLLC

(57) ABSTRACT

Mechanisms for generating an analysis result about a machine are provided. A device generates a first health management (HM) analysis result regarding a machine based on real-time first sensor information received during a first period of time and on a first version HM analytic model. The device provides, to an off-board device, a plurality of sensor information comprising the real-time first sensor information and that is generated during the first period of time. The device receives a second version HM analytic model that is based at least in part on the plurality of sensor information and fault information that identifies actual faults that have occurred on the machine. The device generates a second HM analysis result regarding the machine based on real-time second sensor information received during a second period of time and on the second version HM analytic model.

22 Claims, 8 Drawing Sheets

(58) Field of Classification Search
USPC .......................................................... 702/185
See application file for complete search history.

(56) References Cited

U.S. PATENT DOCUMENTS

| | | | |
|---|---|---|---|
| 2005/0049988 A1* | 3/2005 | Dahlquist | G05B 23/0278 706/46 |
| 2005/0273218 A1 | 12/2005 | Breed et al. | |
| 2006/0167659 A1 | 7/2006 | Miyasaka et al. | |
| 2006/0224533 A1 | 10/2006 | Thaler | |
| 2007/0118333 A1 | 5/2007 | Miyasaka et al. | |
| 2008/0221721 A1 | 9/2008 | Reed et al. | |
| 2011/0071725 A1* | 3/2011 | Kleve | G07C 5/008 701/31.4 |
| 2012/0078460 A1 | 3/2012 | Mortensen | |
| 2013/0069792 A1 | 3/2013 | Blevins et al. | |

OTHER PUBLICATIONS

Collobert, Ronan, et al., "Implementing Neural Networks Efficiently." In Montavon, G., et al., eds. Neural Networks: Tricks of the Trade, 2nd ed. Lecture Notes in Computer Science, vol. 7700, 2012, Springer-Verlag Berlin Heidelberg, pp. 537-557.

Das, Sreerupa, "An Efficient Way to Enable Prognostics in an Onboard System," IEEE Aerospace Conference, Mar. 7-14, 2015, Big Sky, Montana, IEEE, pp. 1-7.

International Search Report and Written Opinion for International Patent Application No. PCT/US2015/026331, mailed Jul. 6, 2015, 14 pages.

International Search Report and Written Opinion for International Patent Application No. PCT/US2015/026370, mailed Jul. 6, 2015, 13 pages.

Patent Examination Report No. 1 for Australian Patent Application No. 2013245998, issued Jan. 27, 2016, 3 pages.

First Examination Report for New Zealand Patent Application No. 700767, mailed Nov. 26, 2015, 4 pages.

International Preliminary Report on Patentability for PCT/US2013/035935, mailed Oct. 23, 2014, 6 pages.

International Search Report and Written Opinion for PCT/US2013/035935 mailed Aug. 5, 2013, 9 pages.

Author Unknown, "Condition Based Maintenance Plus (CBM+) for Material Maintenance," Department of Defense Instruction, No. 4151.22, Dec. 2, 2007, 11 pages.

Author Unknown, "Condition Based Maintenance Plus (CBM+) Roadmap," Deputy Chief of Staff, G-4 Headquarters, Department of the Army, Logistics Innovation Agency, Dec. 13, 2007, 88 pages.

Bechtel, "Architectural Design Challenges for Ground Vehicle CBM+ System of Systems," Presented at Purdue: Systems Integrity for Defense Summit, Mar. 30-31, 2009, West Lafayette, Indiana, TACOM/TARDEC, 11 pages.

Brown et al., "Prognostics and Health Management: A Data-Driven Approach to Supporting the F-35 Lightning II," Presented at IEEE Aerospace Conference, Mar. 3-10, 2007, Big Sky, Montana, 12 pages.

Das et al., "Essential Steps in Prognostic Health Management," Presented at IEEE International Conference on Prognostics and Health Management, Jun. 20-23, 2011, Montreal, Quebec, Canada, 9 pages.

Gorsich et al., "Ground Vehicle Condition Based Maintenance," Presented at NATO AVT172 CBM Workshop, Bucharest, Romania, Oct. 4-8, 2010, TACOM/TARDEC, 39 pages.

Grantner et al., "Condition Based Maintenance for Light Trucks," Presented at IEEE International Conference on Systems, Man, and Cybernetics, Oct. 10-13, 2010, Istanbul, Turkey, 9 pages.

McCollom et al., "PHM on the F-35 Fighter," Presented at IEEE Conference on Prognostics and Health Management, Jun. 20-23, 2011, Montreal, Quebec, Canada, 10 pages.

Rabeno et al., "Condition Based Maintenance of Military Ground Vehicles," Presented at IEEE Aerospace Conference, Mar. 7-14, 2009, Big Sky, Montana, 6 pages.

Non-Final Office Action for U.S. Appl. No. 14/689,264, mailed Mar. 2, 2016, 10 pages.

Notice of Acceptance for Australian Patent Application No. 2013245998, mailed Jul. 14, 2016, 2 pages.

Further Examination Report for New Zealand Patent Application No. 700767, mailed Aug. 8, 2016, 2 pages.

Notice of Allowance for U.S. Appl. No. 14/689,264, mailed Jul. 20, 2016, 9 pages.

Further Examination Report for New Zealand Patent Application No. 700767, mailed Apr. 8, 2016, 3 pages.

Further Examination Report Postponed Acceptance for New Zealand Patent Application No. 700767, mailed Oct. 21, 2016, 1 page.

International Preliminary Report on Patentability for International Patent Application No. PCT/US2015/026331, mailed Oct. 27, 2016, 10 pages.

International Preliminary Report on Patentability for International Patent Application No. PCT/US2015/026370, mailed Oct. 27, 2016, 9 pages.

\* cited by examiner

EFFICIENT HEALTH MANAGEMENT, DIAGNOSIS AND PROGNOSIS OF A MACHINE

RELATED APPLICATIONS

This application claims the benefit of provisional patent application Ser. No. 61/622,141, filed Apr. 10, 2012, the disclosure of which is hereby incorporated herein by reference in its entirety.

TECHNICAL FIELD

The embodiments relate generally to the real-time health management analysis of a machine that includes a plurality of components, and in particular to a real-time health management device (HMD) that receives updated analytic models over periods of time based on sensor information associated with the machine, to improve the accuracy of analysis results generated by the HMD.

BACKGROUND

Maintaining machinery can be expensive and logistically challenging. Often, complex machines with many different interrelated components, such as vehicles, are maintained based on a maintenance schedule that is time-based, or are reactively maintained in response to actual failures of the machines. Because time-based maintenance typically does not take into consideration the conditions under which the machine is operating, maintenance may be performed prior to or subsequent to an actual need for maintenance. In the context of a relatively large fleet of machines, replacing parts that do not need replacement can be expensive and unnecessarily removes the machine from operation during the unnecessary maintenance. Collectively, such time-based maintenance can make it difficult or impossible to optimize mission availability of a fleet of machines.

There is increased interest in health management systems, such as condition-based maintenance (CBM) systems and prognostics and health management (PHM) systems that attempt to more closely align maintenance of a machine with an actual need for maintenance. In such systems, sensor information may be collected from strategically placed sensors located on the machine, and periodically offloaded to a remote device, such as a server, which can then perform data mining and other analysis to generate diagnostic and prognostic reports on the machine based on the sensor information.

Periodic analysis of data for purposes of diagnostics and prognostics, while an improvement over time-based maintenance, may not diagnose in a timely manner a problem that has only just arisen. The intervals between periods of analysis may result in maintenance issues being undiagnosed in a timely manner. Where timely diagnostics and prognostics of the complex machine can be the difference between a safe and an unsafe operation, such as machines used in the military, or machines such as airplanes and helicopters, periodic analysis of data may be insufficient.

Accordingly, there is a need for real-time health management mechanisms that can generate diagnostic and prognostic results based on real-time sensor information, and that can, over time, improve the diagnostic and prognostic results based on historic knowledge of the respective machine.

SUMMARY

The embodiments relate to a health management device (HMD) that generates real-time diagnostic and/or prognostic analysis results on a condition of a machine based on real-time sensor information and an analytics model. In one embodiment, the HMD generates a first health management (HM) analysis result regarding the machine based on real-time first sensor information received during a first period of time and on a first version HM analytic model. The HMD provides, to an off-board device, a plurality of sensor information generated during the first period of time that includes the real-time first sensor information. The HMD device receives a second version HM analytic model that is based at least in part on the plurality of sensor information. The HMD device generates a second HM analysis result regarding a second condition of the machine based on real-time second sensor information received during a second period of time and on the second version HM analytic model.

In some embodiments, the HM analytic model comprises a diagnostic analytic model, such as, for example, a condition-based maintenance (CBM) analytic model. The first HM analysis result comprises a first diagnostic analysis result, the first version HM analytic model comprises a first version diagnostic analytic model, the second version HM analytic model comprises a second version diagnostic analytic model, and the second HM analysis result comprises a second diagnostic analysis result. The HMD may generate many diagnostic analysis results over the first period of time based on the first version diagnostic analytic model. The first period of time may comprise a day, a week, or any other desirable interval of time.

In some embodiments, the HM analytic model comprises a prognostic analytic model, such as, for example, a prognostics and health management (PHM) analytic model. The first HM analysis result comprises a first prognostic analysis result, the first version HM analytic model comprises a first version prognostic analytic model, the second version HM analytic model comprises a second version prognostic analytic model, and the second HM analysis result comprises a second prognostic analysis result. The HMD may generate many prognostic analysis results over the first period of time based on the first version prognostic analytic model.

In some embodiments, the HMD comprises both a diagnostic analytic model and a prognostic analytic model, and provides both diagnostic analysis results and prognostic analysis results over the first period of time.

In some embodiments, the first version diagnostic analytic model is replaced with the second version diagnostic analytic model, and the first version prognostic analytic model is replaced with the second version prognostic analytic model.

In one embodiment, the first diagnostic analysis result is generated by a diagnostic engine that executes on the HMD, and the first prognostic analysis result is generated by a prognostic engine that executes on the HMD. The first version diagnostic analytic model is replaced with the second version diagnostic analytic model without interruption to the prognostic engine.

Similarly, in one embodiment, the first version prognostic analytic model is replaced with the second version prognostic analytic model without interruption to the diagnostic engine. In some embodiments, the first version diagnostic analytic model may be replaced with the second version diagnostic analytic model without interruption to the diagnostic engine.

In one embodiment, the prognostic analytic model comprises a Gaussian mixture model (GMM). Based on the GMM, the HMD may generate a prognostic analysis result that comprises data predicting a future fault of a component of the machine, and a probability of the future fault.

In another embodiment, an off-board device is provided that includes a communications interface that is configured to communicate with a HMD associated with a machine. The off-board device receives, from the HMD, a plurality of sensor information that identifies real-time characteristics associated with a plurality of components of the machine over a first period of time. The off-board device updates, based on the plurality of sensor information, a first version HM analytic model that correlates sensor information with conditions of the machine, to generate a second version HM analytic model, and provides the second version HM analytic model to the HMD for use during a second period of time.

In one embodiment, the off-board device also receives fault information that identifies actual faults that have occurred on the machine, correlates the faults to the plurality of sensor information, and updates the first version HM analytic model based on both the plurality of sensor information and the fault information to generate the second version HM analytic model.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments relate to a health management device (HMD) that generates real-time health management (HM) analysis results regarding conditions of a machine based on real-time sensor information and an analytic model. The analytic model is updated by an off-board device based on sensor information recorded by the HMD, and then reloaded onto the HMD. Among other features, the analytic model may be updated without requiring an upgrade of an analytics engine that utilizes the analytic model to generate the analysis results, facilitating efficient and quick improvements of HM analysis results over the life of the machine with no disruption to the operation of the machine.

Generally, the use herein of ordinals, such as "first" or "second" in conjunction with an element is solely for distinguishing what might otherwise be similar or identical labels, and does not by itself imply a priority, a type, an importance, or other attribute, unless otherwise stated herein.

Figure 1:
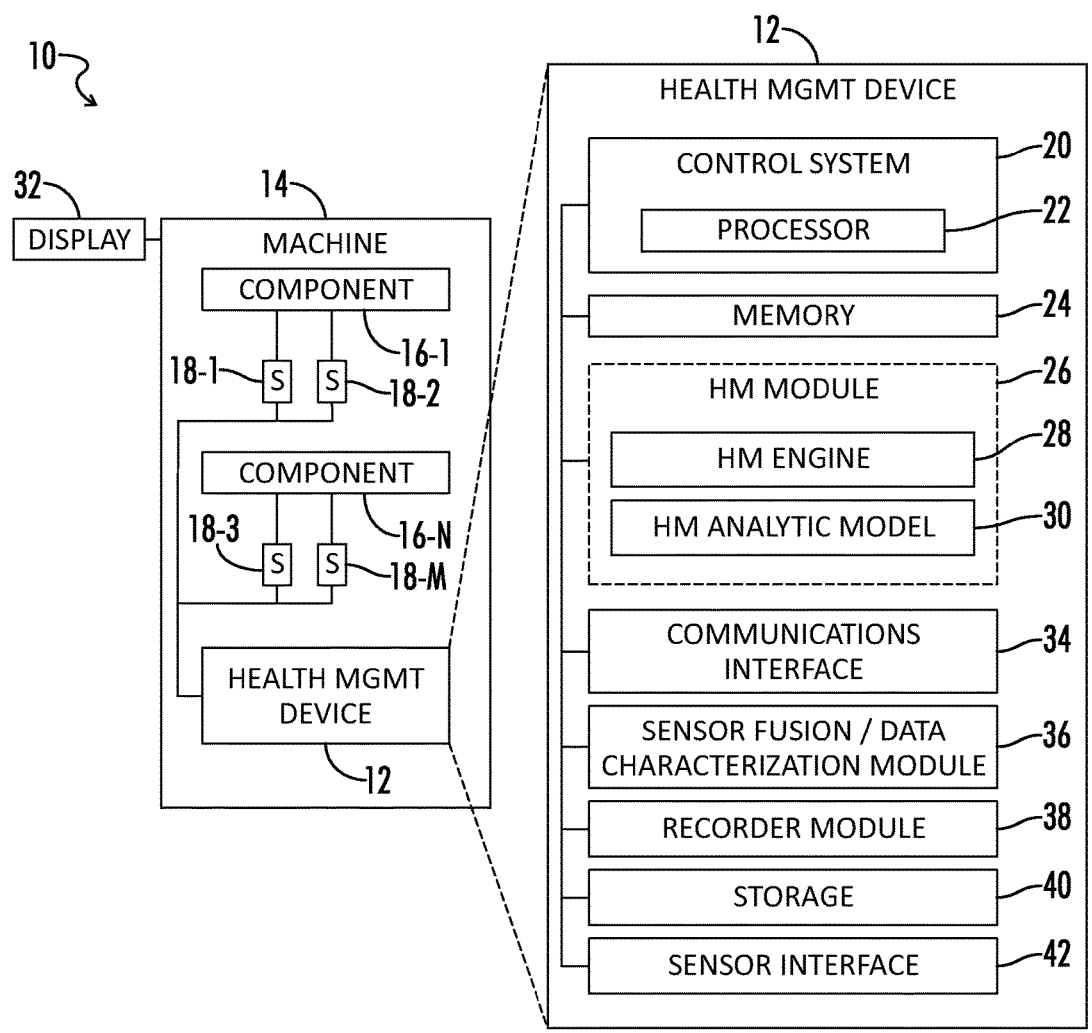
FIG. 1 is a block diagram of a system in which embodiments may be practiced according to one embodiment.

FIG. 1 is a block diagram of a system 10 in which embodiments may be practiced. The system 10 includes a health management device (HMD) 12 that is coupled to or integrated with a machine 14. The machine 14 may comprise any type of machine that includes multiple interrelated components 16-1-16-N (generally, components 16). Non-limiting examples of the machine 14 include aircraft such as airplanes and helicopters and the like, ground vehicles such as cars, trucks, tanks, and the like, power turbines, windmills, or any other machine that includes a plurality of components that have characteristics which may sensed and quantified.

The machine 14 includes a plurality of integrated or communicatively coupled sensors 18-1-18-M (generally sensors 18), each of which senses and identifies a characteristic of a respective component 16 and outputs sensor information that quantifies the characteristic. The sensors 18 may comprise any type of sensor that is capable of detecting, or otherwise sensing, a characteristic of a component 16, and quantifying the characteristic. Non-limiting examples of sensor information includes a status of a battery, a fluid level of fluid used in the operation of the machine 14, an engine oil characteristic, such as temperature, pressure or purity, an engine RPM, a coolant characteristic, a transmission characteristic, a fuel pump characteristic, ambient characteristics (such as temperature, pressure, and/or humidity), and an alternator characteristic.

The sensors 18 provide sensor information to the HMD 12. The HMD 12 may comprise, for example, a printed circuit board that includes components suitable for carrying out the functionality described herein. In other embodiments, the HDM 12 may comprise a device that is communicatively coupled to the machine 14, such as a laptop or tablet computer, or a smartphone.

The HMD 12 may include a control system 20 that comprises a processor 22, and implements functionality described herein, such as coordination of other components of the HMD 12, and communication with an off-board device (not illustrated). In some embodiments, some of the functionality provided herein may be implemented via software instructions that configure the processor 22 to perform the functions discussed herein. Accordingly, functionality discussed in conjunction with other elements depicted in the Figures may in fact be implemented via the control system 20. Moreover, at a more general level, functionality of any of the elements discussed herein with respect to the HMD 12 may be attributed to the HMD 12 generally, rather than a particular component thereof.

A memory 24 may store information, including executable instructions, that in part provides some of the functionality described herein. A HM module 26 comprises a HM engine 28 and a HM analytic model 30. The HM module 26 generates HM analysis results regarding the machine 14 based on sensor information generated by the sensors 18 and the HM analytic model 30. The HM analysis results may be presented to a user on a display 32 in any one or more of many different forms, including textual information, imagery, graphs, one or more LED lights, or the like. The display 32 may also be embodied in any one or more form factors, including, by way of non-limiting example, a plurality of LED lights, an LCD screen mounted on or integrated with the machine 14, an LCD screen of a mobile device in proximity of the machine 14, or the like.

The HM analytic model 30 comprises any suitable type of learning network, such as a Bayesian network, neural network, or the like, that is capable of correlating sensor information with conditions of the components 16 of the machine 14, and that can be trained over time to increase the accuracy of the output of the HM analytic model 30.

As will be described in greater detail herein, in one embodiment, the HM module 26 comprises a diagnostic module, such as a condition-based maintenance (CBM) module, capable of providing diagnostic analysis results that identify a current condition of one or more components 16 of the machine 14. The diagnostic analysis may also identify a probability that a current fault is caused by a particular component. In some embodiments, the diagnostic analysis results may identify multiple components 16 along with corresponding probabilities that a current fault is caused by a failure associated with the multiple components 16. In another embodiment, the HM module 26 comprises a prognostic module, such as a prognostics and health management (PHM) module, capable of providing prognostic analysis results that predict a future condition of one or more of the components 16 of the machine 14, and may also include a probability of the likelihood of the future condition at one or more times in the future.

A communications interface 34 is configured to facilitate the exchange of data with an off-board device (not illustrated). The communications interface 34 may comprise, for example, a communications interface that allows the real-time exchange of data with the off-board device, such as a Wi-Fi® interface, Ethernet interface, or the like, or may comprise a communications interface that facilitates non real-time exchange of information, such as a USB interface, or the like.

A sensor fusion/data characterization module 36 processes raw sensor information received from the sensors 18, and, based on the raw sensor information, may preprocess the raw sensor information for further processing by the HM module 26.

A recorder module 38 may receive sensor information from the sensors 18 over a period of time and store the sensor information in a storage 40. The stored sensor information may subsequently be provided to the off-board device for further processing and generation of an updated analytic model, as described in greater detail herein.

A sensor interface 42 may interface with the sensors 18 to receive the sensor information, and provide the sensor information to respective components of the HMD 12, such as the HM module 26, the sensor fusion/data characterization module 36, and the recorder module 38.

Figure 2:
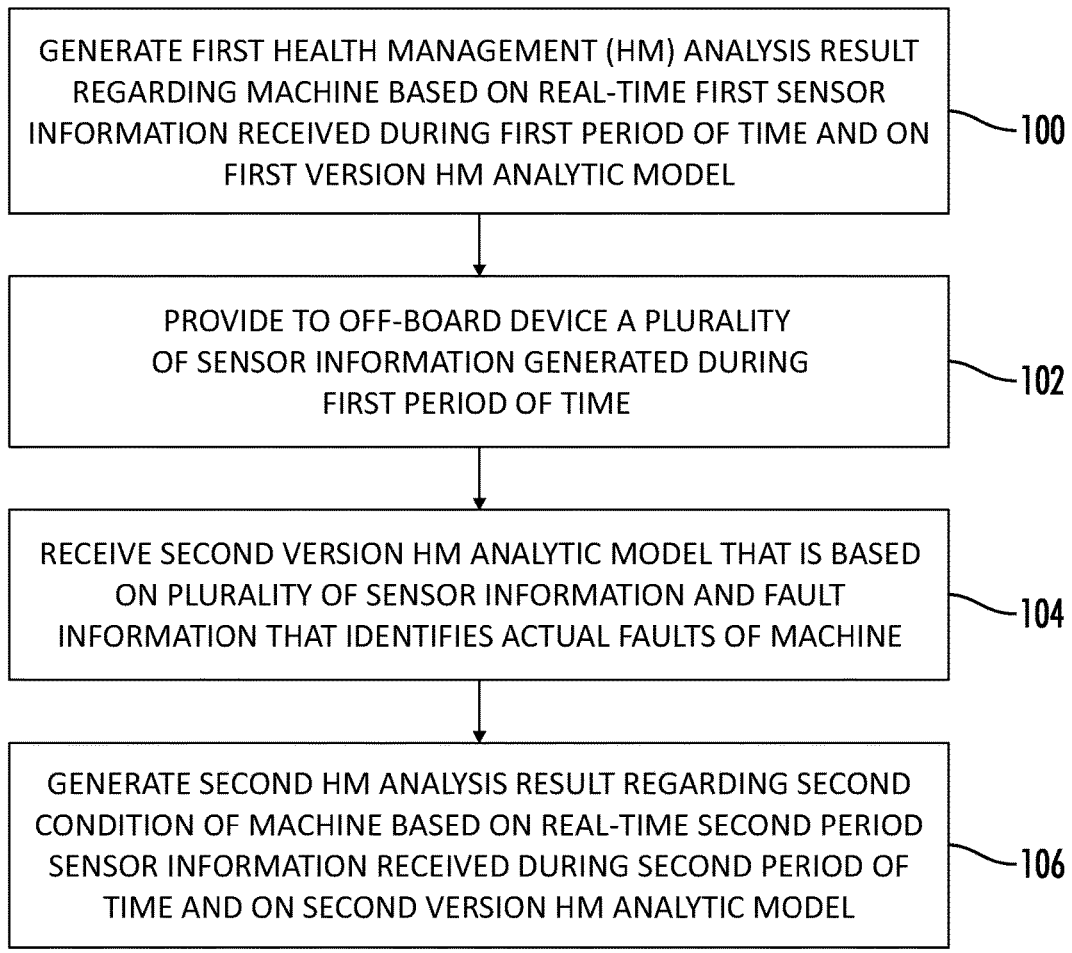
FIG. 2 is a flowchart of a method for generating an analysis result about a machine according to one embodiment.

FIG. 2 is a flowchart of a method for generating an analysis result about the machine 14 according to one embodiment. FIG. 2 will be discussed in conjunction with FIG. 1. Initially, the HMD 12 generates a first HM analysis result regarding the machine 14 based on real-time first sensor information received from one or more of the sensors 18 during a first period of time and based on a first version of the HM analytic model 30 (FIG. 2, block 100). As discussed above, the first HM analysis result may comprise a diagnostic analysis result or may comprise a prognostic analysis result. After the first period of time, the HMD 12 provides to the off-board device (not illustrated) a plurality of sensor information, including the real-time first sensor information used by the HMD 12 to generate the first HM analysis result (FIG. 2, block 102). In some embodiments, the HMD 12 may also provide to the off-board device fault information that identifies actual faults associated with the machine 14. In other embodiments the fault information may be collected independently and provided to the off-board device via, for example, a separate data file or entered by an operator.

The HMD 12 receives from the off-board device a second version HM analytic model 30 that is based, at least in part, on the plurality of sensor information and on the fault information that identifies actual faults associated with the machine 14 (FIG. 2, block 104). The HMD 12 then receives real-time second sensor information that is generated during a second period of time that is subsequent to the first period of time. The HMD 12 generates a second HM analysis result about the machine based on the real-time second sensor information and the second version HM analytic model 30 (FIG. 2, block 106).

The first period of time may comprise any suitable period of time, such as an hour, a day, a week, or the like. The real-time first sensor information is a portion of the plurality of sensor information received during the first period of time. For example, the plurality of sensor information received during the first period of time may comprise sensor information received from each of the sensors 18-1-18-M for the entire first period, such as for a 24 hour period. Each sensor 18 may emit sensor information continually, periodically, intermittently, or on any other basis. The real-time first sensor information may comprise, for example, sensor information received from the sensor 18-2 over a 500 millisecond time interval. Such sensor information may, for example, indicate a temperature of a fluid associated with the component 16-1, and based on this sensor information and the HM analytic model 30, the HM analytic module 26 may generate a diagnostic analysis result that indicates a current problem with the component 16-1.

The phrase "first version" and "second version" in conjunction with the HM analytic model 30 is to distinguish an earlier version from a later version, and does not refer to any specific version of the HM analytic model 30. Generally, the HMD 12 provides sensor information that is collected over a period of time, such as the first period of time, and provides it to the off-board device, which, as will be described in greater detail herein, generates an updated version of the HM analytic model 30 based on the recently provided sensor information. This may occur many times over the life of the machine 14. Each version of the HM analytic model 30 may facilitate increasingly accurate HM analysis results, due to the increased knowledge of the particular machine 14 that is embodied in the most recent version of the HM analytic model 30.

It should also be noted that during the first period of time, the HMD 12 may relatively continually generate HM analysis results regarding one or more conditions of the components 16 based on the first version of the HM analytic model 30. For example, the HMD 12 may continually monitor the sensor information generated during the first period of time, continually analyze the sensor information based on the HM analytic model 30, and, when appropriate based on the HM analytic model 30, generate HM analysis results.

Figure 3:
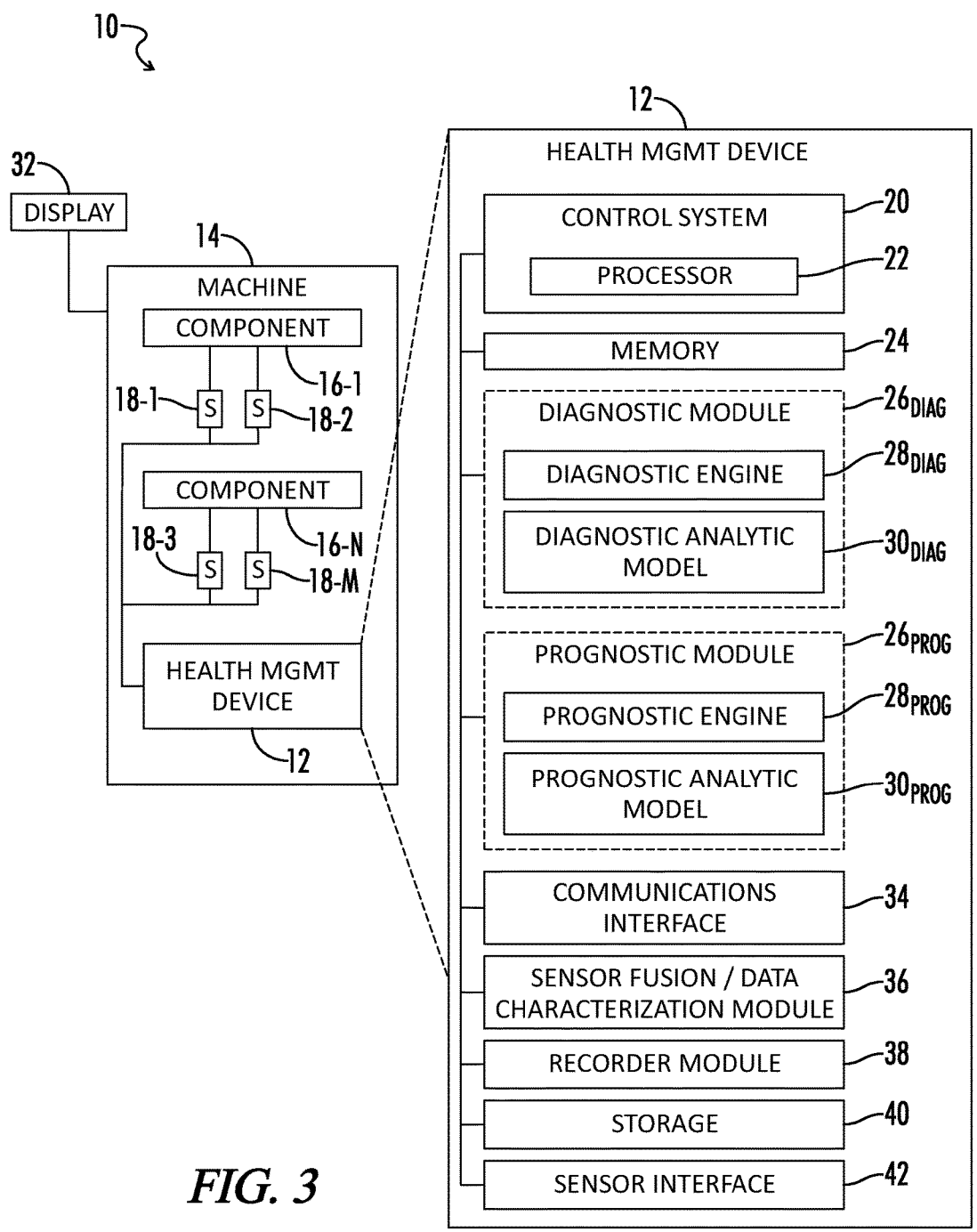
FIG. 3 is a block diagram of a system in which additional embodiments may be practiced according to one embodiment.

FIG. 3 is a block diagram of the system 10 according to another embodiment. In this embodiment, the HMD 12 includes a diagnostic module $26_{DIAG}$, such as a CBM module, that is capable of providing diagnostic analysis results that identify a current condition of one or more components 16 of the machine 14. The HMD 12 also includes a prognostic module $26_{PROG}$, such as a PHM module, that is capable of providing prognostic analysis results that predict a future condition of one or more of the components 16 of the machine 14, and may also include a probability of the likelihood of the future condition at one or more times in the future.

The diagnostic module $26_{DIAG}$ includes a diagnostic engine $28_{DIAG}$ and a diagnostic analytic model $30_{DIAG}$. The prognostic module $26_{PROG}$ includes a prognostic engine $28_{PROG}$ and a prognostic analytic model $30_{PROG}$.

Figure 4:
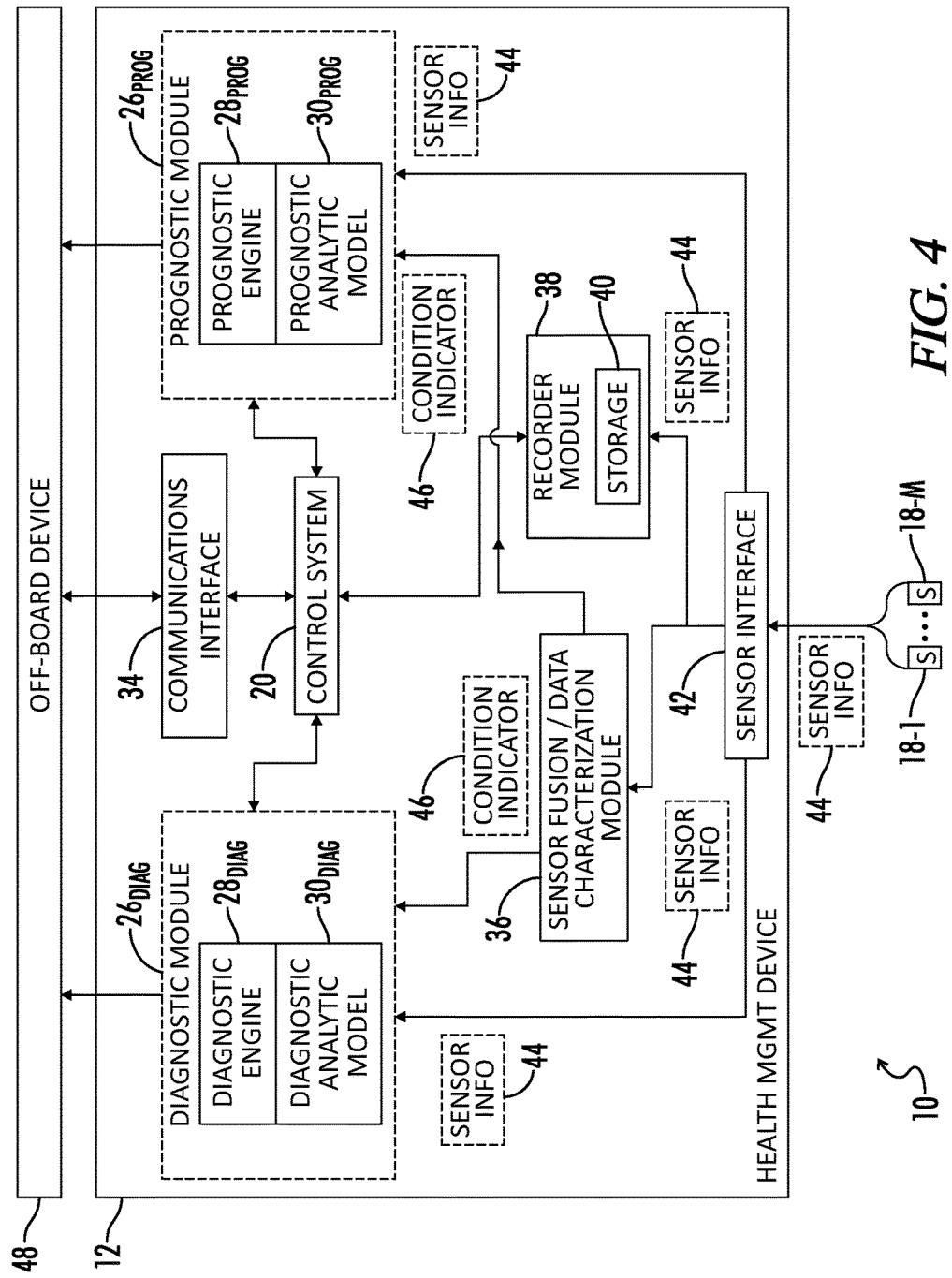
FIG. 4 is a block diagram illustrating example data flow in a health management device (HMD) according to one embodiment.

FIG. 4 is a block diagram illustrating an example flow of information in the HMD 12 illustrated in FIG. 3 according to one embodiment. The sensors 18, over the first period of time, such as over a day, several days, or a week, provide sensor information 44 to the sensor interface 42. The sensor interface 42 provides the sensor information 44 to the diagnostic module $26_{DIAG}$ for processing by the diagnostic module $26_{DIAG}$. The sensor interface 42 also provides the sensor information 44 to the prognostic module $26_{PROG}$ for processing by the prognostic module $26_{PROG}$. The sensor interface 42 provides the sensor information 44 to the sensor fusion/data characterization module 36 for preprocessing of the sensor information 44. The sensor interface 42 also provides the sensor information 44 to the recorder module 38 for storing in the storage 40.

The sensor fusion/data characterization module 36 pre-processes the sensor information 44 and may, based on the sensor information 44, generate one or more condition indicators 46 for further processing by the diagnostic module $26_{DIAG}$ and/or the prognostic module $26_{PROG}$. Pre-processing may include, for example:

(a) noise reduction: the eliminating of noise from the sensor information 44 using, for example, statistical signal processing algorithms, and/or band pass filters;

(b) data validation: doing basic validation checks on the sensor information 44 to ensure the values are possible values, handling missing data, handling abnormal values;

(c) data normalization: scaling data ranges between, for example [0 . . . 1]; and (d) data correlation.

Generally, denoising techniques are used to reduce the noise content in the sensor information 44. Analog and digital filters may be designed that help attenuate the effect of high frequency noise in the sensor information 44. Basic checks (e.g., check on magnitude of values) and data validation methods may be used to ensure the sensor information 44 collected is not grossly faulty. This may also include checking whether the sensor information 44 and the rate at which the sensor information 44 is changing are within predefined operational limits. Also, for sensors 18 that sample data at different frequencies, the resulting sensor information 44 might be correlated by up-sampling or down-sampling the sensor information 44 appropriately.

Pre-processing may also include feature extraction, wherein sensor information 44 is processed to extract features, such as time domain features, or condition indicators that reflect the health of the machine 14. Condition indicators or features embody key information that is obtained by processing the raw sensor information 44. Tracking relevant condition indicators over time may provide a good indication of fault progression in the machine 14. This may help prepare for an impending fault. Examples of time domain features or condition indicators are listed below:

(a) Mean: average value of a time varying signal;

(b) Standard Deviation: measures how much the data points are dispersed from the 'average.' Standard Deviation a (sigma) is the square root of the average value of $(X-\mu)^2$;

(c) Root Mean Square: the Root Mean Square value (RMS) for a vibration signal reflects the energy content of the signal. The RMS may be expressed as:

$$s_{rms} = \sqrt{\frac{1}{N}\sum_{i=1}^{N}(s_i^2)}$$

Where, $s_{rms}$ is the root mean square value of dataset s, $s_i$ is the i-th member of dataset s, and N is the number of points in dataset s;

(d) Delta RMS: this parameter is the difference between two consequent RMS values. This parameter focuses on the trend of the vibration and is sensitive to vibration signal changes;

(e) Peak Value: this is the maximum value of the signal in a selected time frame;

(f) Crest Factor: this parameter indicates the damage in an early stage. It is defined as the peak value of the signal divided by the RMS value of the signal; and (g) Kurtosis: kurtosis describes how peaked or flat the distribution is. It is given by:

$$Kurt = \frac{N \cdot \sum_{i=1}^{N}(s_i - \bar{s})^4}{\left(\sum_{i=1}^{N}(s_i - \bar{s})^2\right)^2},$$

Where

Kurt is kurtosis,

N is the number of points in the time history of signal s, $s_i$ is the i-th point in the time history of signal s.

Thus, kurtosis is the fourth centralized moment of the signal, normalized by the square of the variance.

In addition to the time domain features described above, features can be extracted from the frequency domain, order domain, or joint time-frequency domain.

In one embodiment, the diagnostic module $26_{DIAG}$ executes, or otherwise processes, as an independent service. In particular, the diagnostic engine $28_{DIAG}$, which may comprise, for example, one or more software modules, may be initiated as a service that executes continually. The diagnostic engine $28_{DIAG}$, as appropriate and based on sensor information 44, either directly or via the condition indicators 46, may access the diagnostic analytic model $30_{DIAG}$ and generate a diagnostic analysis result. In some embodiments, a first version of the diagnostic analytic model $30_{DIAG}$ may be replaced with a second version of the diagnostic analytic model $30_{DIAG}$ without the need to terminate the diagnostic engine $28_{DIAG}$. Thus, the embodiments facilitate increasingly accurate diagnostic analysis results for the machine 14 without the need to update the diagnostic engine $28_{DIAG}$.

Similarly, in one embodiment, the prognostic module $26_{PROG}$ executes, or otherwise processes, as an independent service. In particular, the prognostic engine $28_{PROG}$, which may comprise, for example, one or more software modules, may be initiated as a service that executes continually. The prognostic engine $28_{PROG}$, as appropriate and based on sensor information 44, either directly or via the condition indicators 46, may access the prognostic analytic model $30_{PROG}$ and generate a prognostic analysis result. In some embodiments, a first version of the prognostic analytic model $30_{PROG}$ may be replaced with a second version of the prognostic analytic model $30_{PROG}$ without the need to terminate the prognostic engine $28_{PROG}$. Thus, the embodiments facilitate increasingly accurate prognostic analysis results for the machine 14 without the need to update the prognostic engine $28_{PROG}$.

An initial version of the diagnostic analytic model $30_{DIAG}$ may be based on failure data such as actual fault information associated with machines similar to the machine 14, expert knowledge, and/or operating manuals of components 16. The diagnostic analytic model $30_{DIAG}$ may comprise, for example, a learning network such as a Bayesian network. Over multiple periods of time, and multiple updated versions of the diagnostic analytic model $30_{DIAG}$, each of which is based on sensor information 44 generated during such periods of time, the diagnostic analytic model $30_{DIAG}$ becomes increasingly knowledgeable about the specific machine 14, and can provide increasingly accurate diagnostic analysis results.

In some embodiments the diagnostic analytic model $30_{DIAG}$ may comprise a decision tree that comprises rules that are created based on historical failure data associated with the machine 14 or machines similar to the machine 14, expert knowledge, and/or operating manuals of components 16. When the sensor information 44 indicates an alert, the diagnostic module $26_{DIAG}$ may process the decision tree, and based on the decision tree generate a diagnostic analytic result that identifies a condition of the machine 14.

An initial version of the prognostic analytic model $30_{PROG}$ may include a model that facilitates the recognition of complex patterns and intelligent decisions based on the sensor information 44 and/or condition indicators 46. In some embodiments, the prognostic analytic model $30_{PROG}$ may comprise one or more of a decision tree, a neural network, the utilization of genetic programming, the utilization of a support vector machine, a Bayesian network, the utilization of reinforcement learning, a regression model, or a Gaussian Mixture Model (GMM).

Figure 5:
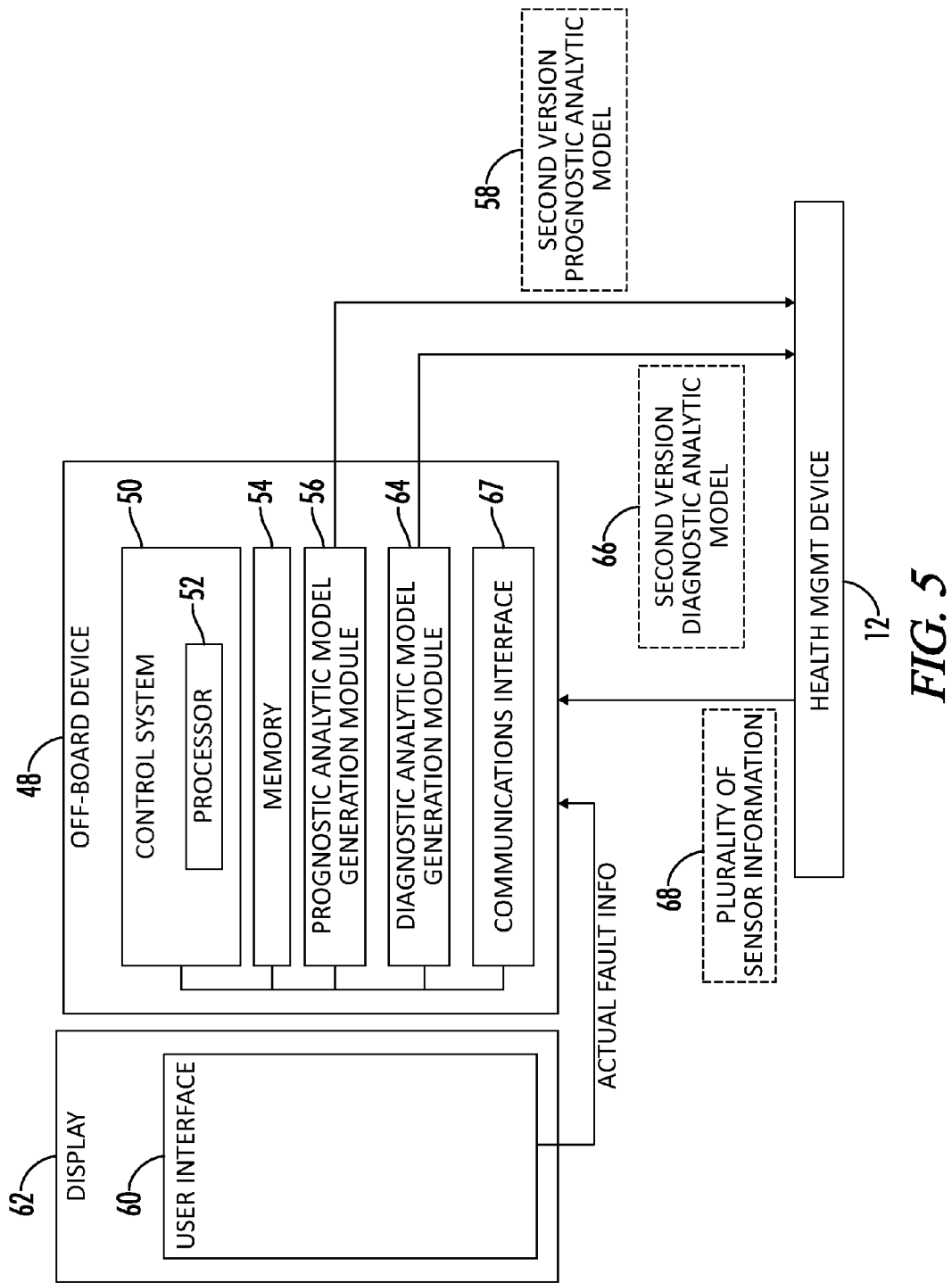
FIG. 5 is a block diagram of an off-board device according to one embodiment.

FIG. 5 is a block diagram of an off-board device 48 according to one embodiment. The off-board device 48 may include a control system 50 that comprises a processor 52, and implements functionality described herein. In some embodiments, some of the functionality provided herein may be implemented via software instructions that configure the processor 52 to perform the functionality described herein. Accordingly, functionality discussed in conjunction with other elements depicted in the Figures may in fact be implemented via the control system 50. Moreover, at a more general level, functionality of any of the elements discussed herein with respect to the off-board device 48 may be attributed to the off-board device 48 generally, rather than a particular component thereof.

A memory 54 may store information, including executable instructions, that in part provides some of the functionality described herein. A prognostic analytic model generation module (PAMGM) 56 generates the second version 58 of the prognostic analytic model $30_{PROG}$ based on sensor information received from the HMD 12. Generally, the PAMGM 56 trains the previous version of the prognostic analytic model $30_{PROG}$, which has been retained by the PAMGM 56, based on at least the sensor information provided by the HMD 12, to generate the second version 58 of the prognostic analytic model $30_{PROG}$. The particular training mechanism used may differ depending on the type of prognostic analytic model $30_{PROG}$. The off-board device 48 may, via a user interface 60 displayed on a display 62 for example, allow an operator to input additional information for use by the PAMGM 56 in generating the second version 58 of the prognostic analytic model $30_{PROG}$. For example, in one embodiment, fault information that identifies actual faults of the machine 14 may be input via the user interface 60. The off-board device 48 may correlate the fault information to the plurality of sensor information received from the HMD 12. Thus, the second version 58 of the prognostic analytic model $30_{PROG}$ may be based, at least in part, on such fault information as well as the sensor information.

A diagnostic analytic model generation module (DAMGM) 64 generates the second version 66 of the diagnostic analytic model $30_{DIAG}$ based on the sensor information received from the HMD 12. Generally, the DAMGM 64 trains the previous version of the diagnostic analytic model $30_{DIAG}$, which has been retained by the DAMGM 64, based on at least the sensor information provided by the HMD 12, to generate the second version 66 of the diagnostic analytic model $30_{DIAG}$. Again, the particular training mechanism used may differ depending on the type of diagnostic analytic model $30_{DIAG}$. The off-board device 48 may allow the operator to input additional information for use by the DAMGM 64 in generating the second version 66 of the diagnostic analytic model $30_{DIAG}$. For example, the fault information that identifies actual faults of the machine 14 may be input via the user interface 60. Thus, the second version 66 of the diagnostic analytic model $30_{DIAG}$ may be based, at least in part, on such fault information as well as the sensor information received from the HMD 12.

The off-board device 48 may include a communications interface 67 configured to communicate with the HMD 12.

In some embodiments, the off-board device 48 may store, or otherwise retain, historical sensor information for the machine 14, and allow the operator to identify a particular amount of historical sensor information to use, such as the most recent two weeks, or four weeks, of the most recent sensor information to generate the second version analytic models 58, 66.

Figure 6:
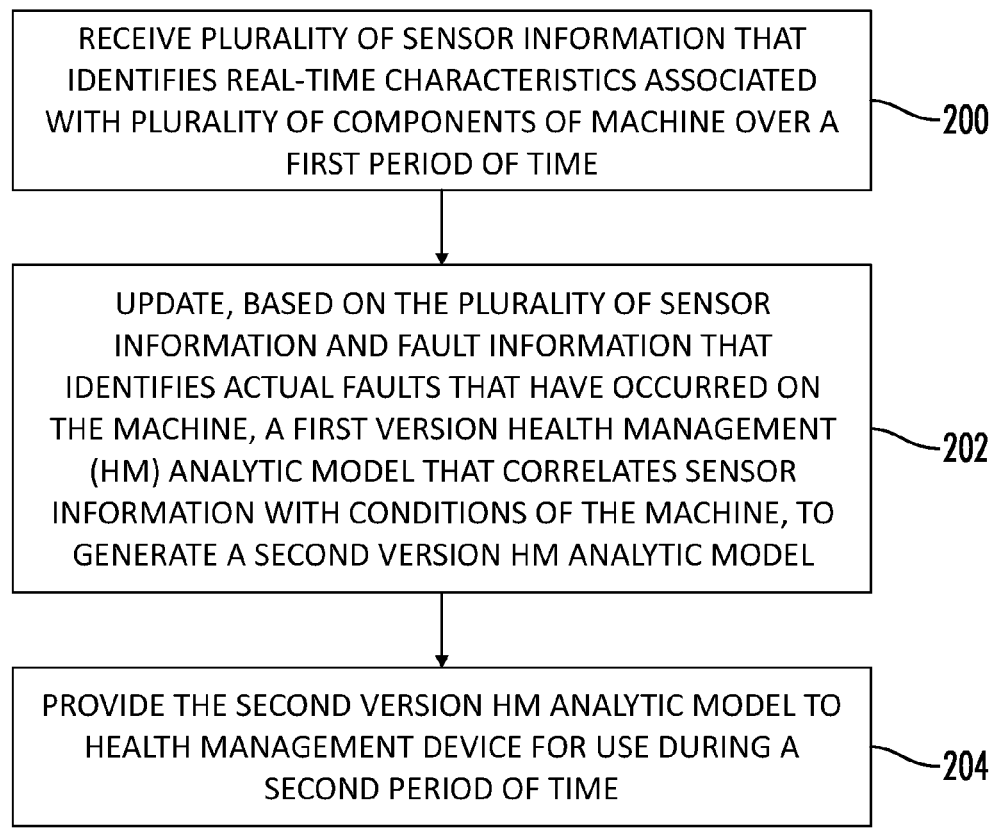
FIG. 6 is a flowchart of a method for generating a second version health management analytic model according to one embodiment.

FIG. 6 is a flowchart of a method for generating a second version HM analytic model according to one embodiment and will be discussed in conjunction with FIG. 5. The process described herein may apply similarly to the generation of the second version 58 of the prognostic analytic model $30_{PROG}$ or the generation of the second version 66 of the diagnostic analytic model $30_{DIAG}$. The off-board device 48 receives a plurality of sensor information 68 that is generated over the first period of time (FIG. 6, block 200). The plurality of sensor information 68 identifies characteristics associated with the plurality of components 16 of the machine 14. As discussed above, the first period of time may comprise any suitable interval of time, such as, for example, a day, a week, a month, or the like. The off-board device 48 also receives the fault information that identifies actual faults that have occurred on the machine 14.

The off-board device 48 updates, based on the plurality of sensor information 68 and the fault information, a first version of the HM analytic model 30 that correlates sensor information with conditions of the machine 14, to generate a second version of the HM analytic model 30 (FIG. 6, block 202). As discussed above, the updating process typically involves a training process suitable for the type of learning network of the particular HM analytic model 30. The off-board device 48 provides the second version of the HM analytic model 30 to the HMD 12 for use during a future, second period of time (FIG. 6, block 204). The off-board device 48 may also correlate the fault information that identifies actual faults that have occurred on the machine 14 to the plurality of sensor information 68.

Figure 7:
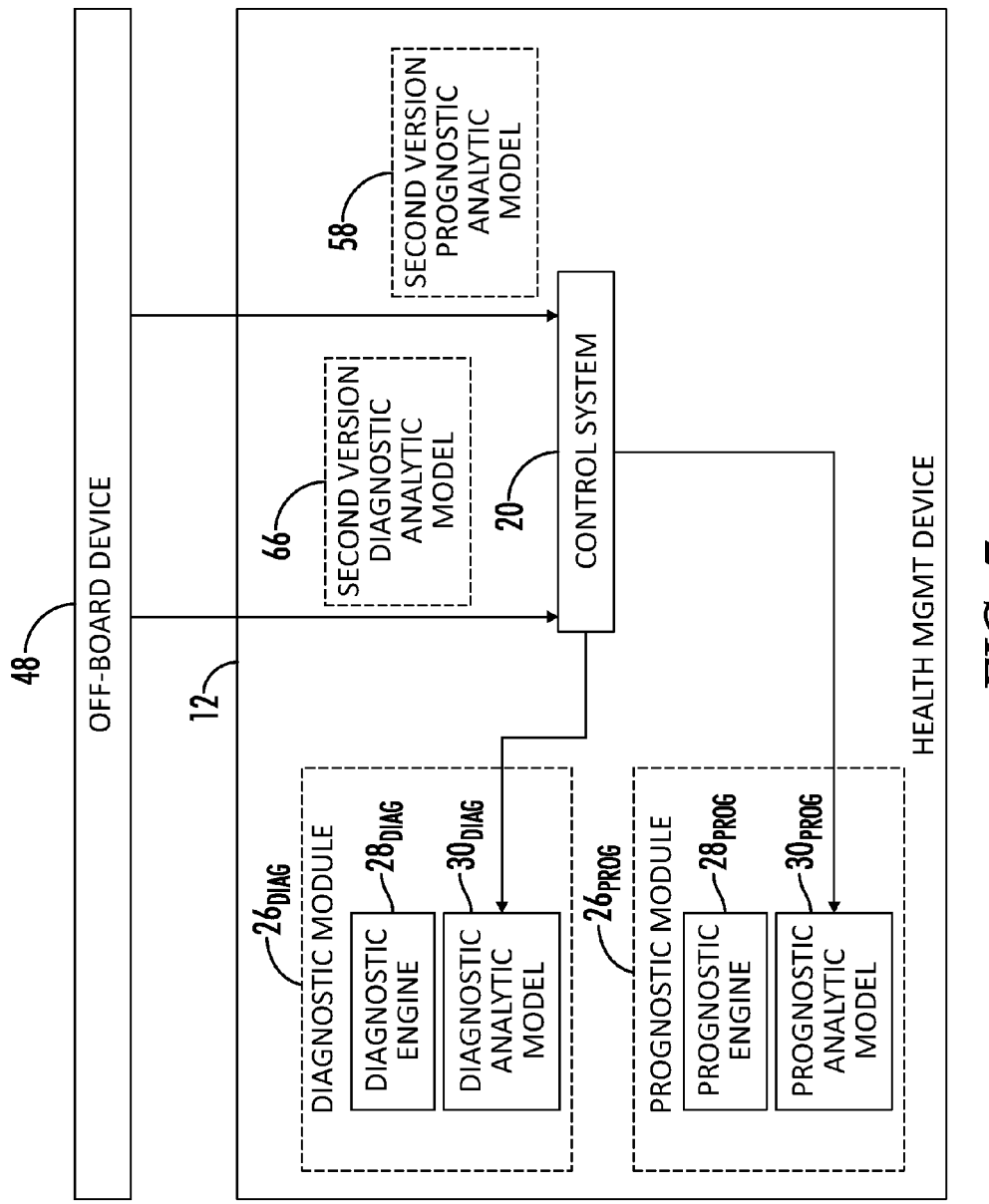
FIG. 7 is a block diagram illustrating the updating of an analytic model in the HMD according to one embodiment.

FIG. 7 is a block diagram illustrating the updating of an analytic model from one version to a subsequent version according to one embodiment. For purposes of illustration, certain components previously illustrated in conjunction with the HMD 12 have been omitted from FIG. 7. Prior to discussing the updating of an analytic model from one version to another, a brief discussion of the interaction between an analytic engine, such as the diagnostic engine $28_{DIAG}$ and an analytic model, such as the diagnostic analytic model $30_{DIAG}$, during operation will be provided.

As discussed previously, in some embodiments the diagnostic engine $28_{DIAG}$ executes, or otherwise processes, as an independent service. Thus, for example, when the HMD 12 initially powers up, the HMD 12 may initialize the diagnostic engine $28_{DIAG}$. During operation, the diagnostic engine $28_{DIAG}$ determines, periodically, or in response to sensor information 44, that the diagnostic analytic model $30_{DIAG}$ should be initiated. In one embodiment, the diagnostic analytic model $30_{DIAG}$ comprises one or more executable files that may by initiated by the diagnostic engine $28_{DIAG}$. After the diagnostic analytic model $30_{DIAG}$ completes, the diagnostic analytic model $30_{DIAG}$ may communicate the result of the analysis to the diagnostic engine $28_{DIAG}$, and then terminate. The diagnostic engine $28_{DIAG}$ may then generate the diagnostic analysis result based on the communication. This process may be performed repeatedly, multiple times, during the first period of time. During the first period of time, the diagnostic engine $28_{DIAG}$ may remain executing indefinitely, while the diagnostic analytic model $30_{DIAG}$ initializes and terminates after each analysis is completed.

Similarly, the prognostic engine $28_{PROG}$ determines, periodically, or in response to sensor information 44, that the prognostic analytic model $30_{PROG}$ should be initiated. Again, after each analysis is completed, the prognostic analytic model $30_{PROG}$ may terminate.

A method for updating versions of an analytic model according to one embodiment will now be discussed. Upon receipt of the second version 66 of the diagnostic analytic model $30_{DIAG}$ from the off-board device 48, during which time the diagnostic engine $28_{DIAG}$ may have continually used the first version of the diagnostic analytic model $30_{DIAG}$, the control system 20 may, in one embodiment, replace the first version of the diagnostic analytic model $30_{DIAG}$ with the second version 66 of the diagnostic analytic model $30_{DIAG}$. The next time the diagnostic engine $28_{DIAG}$ determines that a diagnostic analysis is to be performed, the diagnostic engine $28_{DIAG}$ initializes the diagnostic analytic model $30_{DIAG}$, which will now be the second version 66 of the diagnostic analytic model $30_{DIAG}$. This mechanism allows the diagnostic engine $28_{DIAG}$ to provide, over time, increasingly accurate diagnostic analysis results based on continually updated versions of the diagnostic analytic model $30_{DIAG}$, without the need to take the HMD 12 out of operation.

Similarly, upon receipt of the second version 58 of the prognostic analytic model $30_{PROG}$ from the off-board device 48, the control system 20 may replace the first version of the prognostic analytic model $30_{PROG}$ with the second version 58 of the prognostic analytic model $30_{PROG}$. The next time the prognostic engine $28_{PROG}$ determines that a prognostic analysis is to be performed, the prognostic engine $28_{PROG}$ initializes the prognostic analytic model $30_{PROG}$, which will now be the second version 58 of the prognostic analytic model $30_{PROG}$. This mechanism allows the prognostic engine $28_{PROG}$ to provide, over time, increasingly accurate prognostic analysis results based on continually updated versions of the prognostic analytic model $30_{PROG}$, without the need to take the HMD 12 out of operation.

In some embodiments, the prognostic analytic model $30_{PROG}$ comprises a GMM, which may be used by the prognostic module $26_{PROG}$ to predict a future fault given current real-time sensor information 44.

Figure 8:
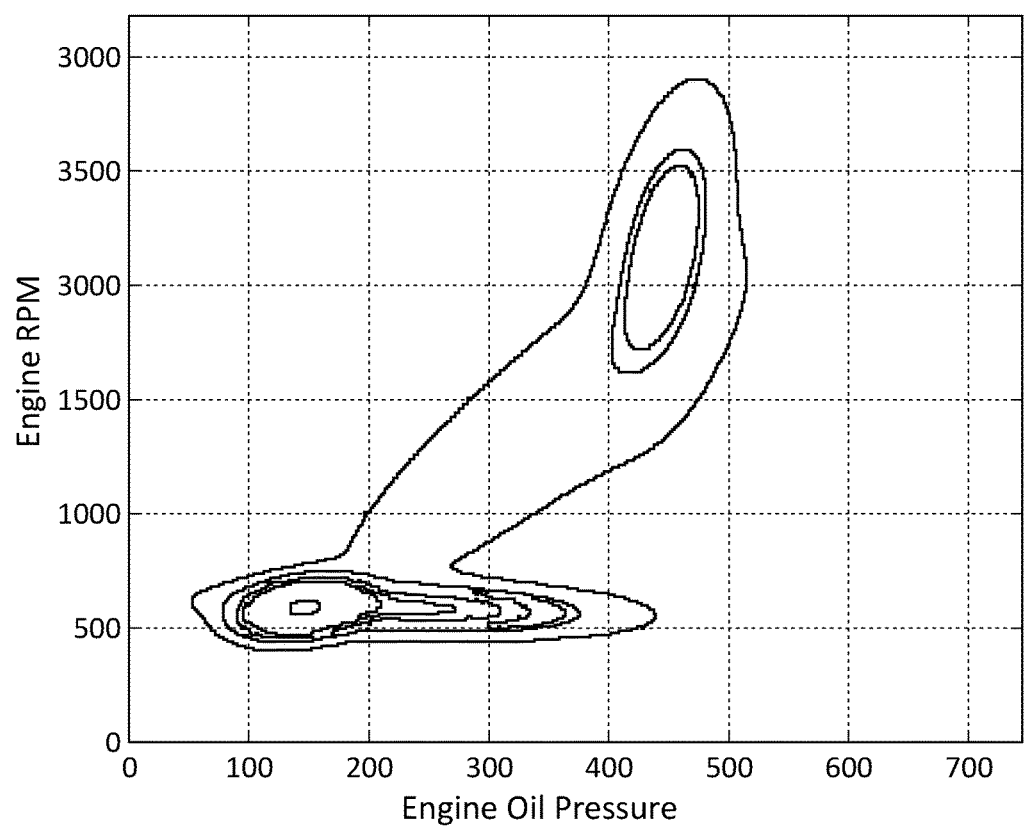
FIG. 8 is a graph illustrating an example Gaussian mixture model (GMM) that represents the probability distribution of engine oil pressure and engine speed for a period of time in a vehicle's life according to one embodiment.

FIG. 8 is a graph illustrating an example GMM that represents the probability distribution of engine oil pressure and engine speed per a vehicle's life. Assume that the machine 14 is a vehicle, and the GMM illustrated in FIG. 8 is generated by the off-board device 48 over multiple periods of time during which the off-board device 48 received sensor information 44 that included information such as engine oil pressure and engine speed. The GMM may then be provided to the HMD 12, for use in generating a prognostic analysis result.

The prognostic engine $28_{PROG}$, based on real-time sensor information 44 and the GMM, may determine that the engine oil pressure versus engine speed is beginning to deviate from that represented in the GMM. Based on the observed deviation, the prognostic engine $28_{PROG}$ may issue a diagnostic analysis report estimating a probability of a fault at a future time.

Those skilled in the art will recognize improvements and modifications to the preferred embodiments of the present disclosure. All such improvements and modifications are considered within the scope of the concepts disclosed herein and the claims that follow.

What is claimed is:

1. A method for generating an analysis result about a machine, comprising:
   generating, by a device, a first health management (HM) analysis result regarding the machine based on real-time first sensor information received during a first period of time and on a first version HM analytic model that correlates the real-time first sensor information with a condition of a component of the machine;
   providing, to an off-board device, a plurality of sensor information comprising the real-time first sensor information and that is generated during the first period of time;
   receiving, by the device, a second version HM analytic model that is based at least in part on the plurality of sensor information and on fault information that identifies actual faults of the machine;
   replacing the first version HM analytic model with the second version HM analytic model; and
   generating a second HM analysis result regarding the machine based on real-time second sensor information received during a second period of time and on the second version HM analytic model, the second version HM analytic model correlating the real-time second sensor information with a condition of a component of the machine.

2. The method of claim 1, wherein the first HM analysis result comprises a first diagnostic analysis result, the first version HM analytic model comprises a first version diagnostic analytic model, the second version HM analytic model comprises a second version diagnostic analytic model, and the second HM analysis result comprises a second diagnostic analysis result, further comprising:
generating a first prognostic analysis result regarding the machine based on the real-time first sensor information during the first period of time and on a first version prognostic analytic model;
receiving a second version prognostic analytic model that is based at least in part on the plurality of sensor information and on the fault information that identifies the actual faults of the machine; and
generating a second prognostic analysis result regarding the machine based on the real-time second sensor information during the second period of time and on the second version prognostic analytic model.

3. The method of claim 2, further comprising:
replacing the first version diagnostic analytic model with the second version diagnostic analytic model on the device prior to generating the second diagnostic analysis result.

4. The method of claim 3, wherein the first diagnostic analysis result is generated by a diagnostic engine that executes on the device, and the first prognostic analysis result is generated by a prognostic engine that executes on the device, and wherein replacing the first version diagnostic analytic model with the second version diagnostic analytic model on the device further comprises replacing the first version diagnostic analytic model with the second version diagnostic analytic model on the device without interruption to the prognostic engine.

5. The method of claim 4, further comprising replacing the first version prognostic analytic model with the second version prognostic analytic model on the device prior to generating the second prognostic analysis result without interruption to the diagnostic engine.

6. The method of claim 4, wherein replacing the first version diagnostic analytic model with the second version diagnostic analytic model comprises replacing the first version diagnostic analytic model with the second version diagnostic analytic model without interruption to the diagnostic engine.

7. The method of claim 1, wherein the plurality of sensor information identifies characteristics of components of the machine during the first period of time.

8. The method of claim 1, wherein the real-time first sensor information identifies at least one of a status of a battery, a fluid level, an engine oil characteristic, an engine RPM, a coolant characteristic, a transmission characteristic, an ambient characteristic, a fuel pump characteristic, and an alternator characteristic.

9. The method of claim 1, wherein the first HM analysis result comprises data predicting a future fault of the component of the machine, and a probability of the future fault.

10. The method of claim 9, wherein the second version HM analytic model comprises a Gaussian mixture model.

11. The method of claim 1, wherein the first HM analysis result comprises data identifying a current fault of the machine and a probability that the current fault is associated with a particular component.

12. The method of claim 1 wherein the first version HM analytic model comprises a first version prognostic analytic model and the first HM analysis result comprises a first prognostic analysis result that identifies a predicted future fault of a first component of the machine, and wherein the second version HM analytic model comprises a second version prognostic analytic model and the second HM analysis result comprises a second prognostic analysis result that identifies a predicted future fault of a second component of the machine.

13. A device for generating an analysis result about a machine, comprising:
a communications interface configured to communicate with an off-board device;
a control system comprising a processor coupled to the communications interface and configured to:
generate a first health management (HM) analysis result regarding the machine based on real-time first sensor information received during a first period of time and on a first version HM analytic model that correlates the real-time first sensor information with a condition of a component of the machine;
provide, to the off-board device, a plurality of sensor information comprising the real-time first sensor information and being generated during the first period of time;
receive a second version HM analytic model that is based at least in part on the plurality of sensor information;
replace the first version HM analytic model with the second version HM analytic model; and
generate a second HM analysis result regarding the machine based on real-time second sensor information received during a second period of time and on the second version HM analytic model, the second version HM analytic model correlating the real-time second sensor information with a condition of a component of the machine.

14. The device of claim 13, wherein the first HM analysis result comprises a first diagnostic analysis result, the first version HM analytic model comprises a first version diagnostic analytic model, the second version HM analytic model comprises a second version diagnostic analytic model, and the second HM analysis result comprises a second diagnostic analysis result, and wherein the processor is further configured to:
generate a first prognostic analysis result regarding the machine based on the real-time first sensor information during the first period of time and on a first version prognostic analytic model;
receive a second version prognostic analytic model that is based at least in part on the plurality of sensor information; and
generate a second prognostic analysis result regarding the machine based on the real-time second sensor information during the second period of time and on the second version prognostic analytic model.

15. The device of claim 14, wherein the processor is further configured to:
replace the first version diagnostic analytic model with the second version diagnostic analytic model on the device prior to generating the second diagnostic analysis result.

16. The device of claim 15, wherein the control system further comprises:
a diagnostic engine that is configured to generate the first diagnostic analysis result and the second diagnostic analysis result based on the first version diagnostic analytic model and the second version diagnostic analytic model respectively;

a prognostic engine that is configured to generate the first prognostic analysis result and the second prognostic analysis result based on the first version prognostic analytic model and the second version prognostic analytic model respectively; and wherein the control system is configured to:

replace the first version diagnostic analytic model with the second version diagnostic analytic model without interruption to the prognostic engine.

17. The device of claim 16, wherein the control system is further configured to replace the first version prognostic analytic model with the second version prognostic analytic model without interruption to the diagnostic engine.

18. The device of claim 16, wherein the control system is further configured to replace the first version diagnostic analytic model with the second version diagnostic analytic model without interruption to the diagnostic engine.

19. The device of claim 13, wherein the real-time first sensor information identifies at least one of a status of a battery, a fluid level, an engine oil characteristic, an engine RPM, a coolant characteristic, a transmission characteristic, a fuel pump characteristic, and an alternator characteristic.

20. A device comprising:

a communications interface configured to communicate with a health management (HM) device associated with a machine; and a control system comprising a processor and coupled to the communications interface and configured to:

provide a first version HM analytic model to the HM device for use during a first period of time;

receive, from the HM device, a plurality of sensor information that identifies real-time characteristics associated with a plurality of components of the machine over first period of time;

update, based on the plurality of sensor information and fault information that identifies actual faults that have occurred on the machine, the first version HM analytic model that correlates sensor information with conditions of the machine, to generate a second version HM analytic model; and provide the second version HM analytic model to the HM device for use during a second period of time.

21. The device of claim 20, wherein the control system is further configured to:

receive the fault information from the HM device.

22. A method comprising:

providing a first version health management (HM) analytic model to a HM device for use during a first period of time;

receiving, from the HM device, a plurality of sensor information that identifies real-time characteristics associated with a plurality of components of a machine over the first period of time;

updating, based on the plurality of sensor information and fault information that identifies actual faults that have occurred on the machine, the first version HM analytic model that correlates sensor information with conditions of the machine, to generate a second version HM analytic model; and providing the second version HM analytic model to the HM device for use during a second period of time.

* * * * *